United States Patent
Liu et al.

(10) Patent No.: US 9,484,755 B2
(45) Date of Patent: Nov. 1, 2016

(54) IN-VEHICLE CHARGING CONTROL DEVICE, VEHICLE CHARGING SYSTEM AND VEHICLE

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yu Liu, Guangdong (CN); Lianwen Zhou, Guangdong (CN)

(73) Assignees: BYD Company Limited, Shenzhen, Guangdong (CN); Shenzhen BYD Auto R&D Company Limited, Shenzhen, Guangdong (CN)

( * ) Notice: Subject to any disclaimer, the term of this patent is extended or adjusted under 35 U.S.C. 154(b) by 379 days.

(21) Appl. No.: 14/200,516

(22) Filed: Mar. 7, 2014

(65) Prior Publication Data

US 2014/0184157 A1    Jul. 3, 2014

Related U.S. Application Data

(63) Continuation of application No. PCT/CN2012/081772, filed on Sep. 21, 2012.

(30) Foreign Application Priority Data

Sep. 22, 2011   (CN) .......................... 2011 1 0282263

(51) Int. Cl.
*H02J 7/06* (2006.01)
*H02J 7/00* (2006.01)
(Continued)

(52) U.S. Cl.
CPC ............ *H02J 7/0036* (2013.01); *B60L 3/0069* (2013.01); *B60L 11/1809* (2013.01);
(Continued)

(58) Field of Classification Search
CPC .............. H02J 7/0036; B60L 11/1809; B60L 11/1818; B60L 11/1861; Y02T 10/7005; Y02T 10/7044; Y02T 10/7072; Y02T 10/705
USPC .......................... 320/104, 107, 109, 111, 163
See application file for complete search history.

(56) References Cited

U.S. PATENT DOCUMENTS

| | | | |
|---|---|---|---|
| 5,396,165 A * | 3/1995 | Hwang | ..................... G05F 1/70 323/210 |
| 5,596,258 A | 1/1997 | Kimura et al. | |

(Continued)

FOREIGN PATENT DOCUMENTS

| | | |
|---|---|---|
| CN | 2922242 Y | 7/2007 |
| CN | 201146378 Y | 11/2008 |

(Continued)

OTHER PUBLICATIONS

PCT International Search Report and Written Opinion mailed Dec. 13, 2012, issued in International Application No. PCT/CN2012/081772 (12 pages).

*Primary Examiner* — Edward Tso
*Assistant Examiner* — Aaron Piggush
(74) *Attorney, Agent, or Firm* — Finnegan, Henderson, Farabow, Garrett & Dunner, LLP

(57) ABSTRACT

An in-vehicle charging control device may comprise a control module, a charging socket, and a switching circuit. The charging socket has a charging connection confirming terminal (CC) and a protective grounding terminal (PE). The switching circuit is connected with the charging connection confirming terminal (CC) and the protective grounding terminal (PE) of the charging socket. The control module is connected with an in-vehicle battery via the switching circuit. The charging socket matches with a charging plug. The switching circuit is in a conducting state when the charging plug is plugged in the charging socket and in a disconnection state when the charging plug is not plugged in the charging socket.

11 Claims, 2 Drawing Sheets

(51) Int. Cl.
*B60L 11/18* (2006.01)
*B60L 3/00* (2006.01)
*H01R 13/66* (2006.01)

(52) U.S. Cl.
CPC ....... *B60L 11/1818* (2013.01); *B60L 11/1861* (2013.01); *H01R 13/6616* (2013.01); *Y02T 10/7005* (2013.01); *Y02T 10/705* (2013.01); *Y02T 10/7044* (2013.01); *Y02T 10/7072* (2013.01); *Y02T 90/14* (2013.01)

(56) References Cited

U.S. PATENT DOCUMENTS

2005/0253561 A1 11/2005 Tibbs
2012/0217928 A1* 8/2012 Kulidjian .............. B60L 3/0069
                                                          320/109

FOREIGN PATENT DOCUMENTS

| CN | 201854075 U | 6/2011 |
| CN | 102624038 A | 8/2012 |
| WO | WO 2013/041049 A1 | 3/2013 |

* cited by examiner

IN-VEHICLE CHARGING CONTROL DEVICE, VEHICLE CHARGING SYSTEM AND VEHICLE

CROSS-REFERENCE TO RELATED APPLICATIONS

This application is a continuation application of PCT/CN2012/081772, filed on Sep. 21, 2012, which claims priority to and benefits of Chinese Patent Application No. 201110282263.2, filed with the State Intellectual Property Office of P. R. China on Sep. 22, 2011. The entire contents of the above referenced applications are incorporated herein by reference.

FIELD

The present disclosure generally relates to a vehicle control device, and more particularly to an in-vehicle charging control device, a vehicle charging system and a vehicle.

BACKGROUND

The statements in this section merely provide background information related to the present disclosure and may not constitute prior art.

At present, a conventional in-vehicle charging control device for a vehicle (e.g., an electric car) is used for real time monitoring whether a charging plug of a charging gun is accurately connected with a charging socket of the vehicle, real time monitoring whether charging equipment is in a charging preparing state, and determining whether the vehicle and the charging equipment are in a charging connecting state according to the above monitoring results. However, in order to realize above functions, an in-vehicle battery of the vehicle needs to supply power to a control module of the conventional in-vehicle charging control device all the time. In this way, even when the vehicle does not need to be charged (that is, the charging plug of the charging gun is not plugged in the charging socket of the vehicle), the in-vehicle charging control device still consumes energy of the in-vehicle battery, thus increasing the energy consumption of the vehicle.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to a first aspect of the present disclosure, an in-vehicle charging control device may be provided. The in-vehicle charging control device may comprise a control module, a charging socket and a switching circuit. The charging socket has a charging connection confirming terminal and a protective grounding terminal. The switching circuit is connected with the charging connection confirming terminal and the protective grounding terminal of the charging socket respectively. The control module is connected with a battery in the vehicle (in-vehicle battery) via the switching circuit. The charging connection confirming terminal and the protective grounding terminal of the charging socket match with a charging connection confirming terminal and a protective grounding terminal of a charging plug respectively. The switching circuit is in a conducting state when the charging plug is plugged in the charging socket or in a disconnection state when the charging plug is not plugged in the charging socket.

With the in-vehicle charging control device according to embodiments of the present disclosure, when the charging plug of a charging gun is plugged in the charging socket of the vehicle, that is, the in-vehicle battery and the charging connection confirming terminal and the protective grounding terminal of the charging plug form a closed circuit, the switching circuit is in a conducting state, so that the in-vehicle battery may supply power to the control module. When the charging plug of the charging gun is not plugged in the charging socket of the vehicle, that is, the in-vehicle battery and the charging connection confirming terminal and the protective grounding terminal of the charging plug do not form a closed circuit, the switching circuit is in a disconnection state, and the in-vehicle battery may not supply power to the control module, thus reducing energy consumption of the in-vehicle battery and saving energy.

According to a second aspect of the present disclosure, a vehicle charging system is provided. The vehicle charging system comprises the in-vehicle charging control device according to the first aspect of the present disclosure and the charging gun having the charging plug.

According to a third aspect of the present disclosure, a vehicle is provided. The vehicle comprises the in-vehicle battery and the in-vehicle charging control device according to the first aspect of the present disclosure. The in-vehicle battery is connected with the control module via the switching circuit.

Other advantages and features of the disclosure are described below.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
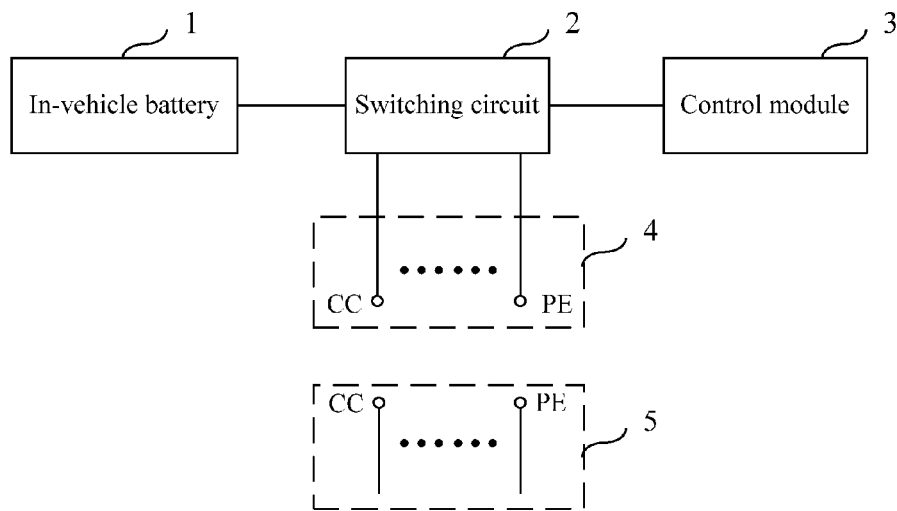
FIG. 1 is a schematic block diagram showing an in-vehicle charging control device according to an exemplary embodiment of the present disclosure.

Embodiments of the present disclosure will be described in detail in the following descriptions, examples of which are shown in the drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

In the following, detailed description of an in-vehicle charging control device will be described, in which like numerals refer to like elements through the drawings.

It has been found by the inventors that the in-vehicle charging control device is used for real time monitoring whether a charging plug of a charging gun is accurately connected with a charging socket of a vehicle, real time monitoring whether charging equipment is in a charging preparing state, and determining whether the vehicle and the charging equipment are in a charging connecting state according to above monitoring results, only when the charging plug of the charging gun is plugged in the charging socket of the vehicle. However, when the charging plug of the charging gun is not plugged in the charging socket of the vehicle, the in-vehicle charging control device does not need to work. Therefore, when the charging plug of the charging gun is not plugged in the charging socket of the vehicle, the in-vehicle battery does not need to supply power to the control module of the in-vehicle charging control device, thus reducing the energy consumption of the in-vehicle battery.

There may be two conditions to determine an accurate connection between the charging plug of the charging gun and the charging socket of the vehicle. First, the charging plug of the charging gun has been plugged in the charging socket of the vehicle. Second, the charging triggering conditions (for example, pressing the starting button or switching on the starting switch) are met. That is, when the charging plug of the charging gun has been plugged in the charging socket of the vehicle and the charging triggering conditions are met, it is determined that the charging plug of the charging gun is accurately connected with the charging socket of the vehicle. Although the description uses "in-vehicle" to modify the charging device or the battery, a person having ordinary skill in the art should appreciate that it does not necessarily mean that all the components of the modified element are in a vehicle. Also, a person having ordinary skill in the art should appreciate that the invention can be applied to devices, other than a vehicle.

Based on the above concept, an in-vehicle charging control device is provided.

As shown in FIG. 1, the in-vehicle charging control device may comprise a control module 3, a charging socket 4 and a switching circuit 2. The charging socket 4 has a charging connection confirming terminal CC and a protective grounding terminal PE. The switching circuit 2 is connected with the charging connection confirming terminal CC and the protective grounding terminal PE of the charging socket 4 respectively. The control module 3 is connected with an in-vehicle battery 1 via the switching circuit 2. The charging connection confirming terminal CC and the protective grounding terminal PE of the charging socket 4 match with a charging connection confirming terminal CC and a protective grounding terminal PE of a charging plug 5 respectively. The charging socket 4 is a charging socket on the vehicle, and the charging plug 5 is a charging plug on a charging gun. When the charging plug 5 is plugged in the charging socket 4, that is, the in-vehicle battery 1 and the charging connection confirming terminal CC and the protective grounding terminal PE of the charging plug 5 form a closed circuit, the switching circuit 2 is in a conducting state, so that the in-vehicle battery 1 may supply power to the control module 3. When the charging plug 5 is not plugged in the charging socket 4, that is, the in-vehicle battery 1 and the charging connection confirming terminal CC and the protective grounding terminal PE of the charging plug 5 do not form a closed circuit, the switching circuit 2 is in a disconnection state, and the in-vehicle battery 1 may not supply power to the control module 3, thus reducing the energy consumption of the in-vehicle battery 1.

The charging plug 5 matches with the charging socket 4. The charging plug 5 may comprise a plurality of terminals, and the number of terminals may vary according to different standards. In the present disclosure, for example, only the charging connection confirming terminal CC and the protective grounding terminal PE are involved, so other terminals will not be described.

In some embodiments, a path between the charging connection confirming terminal CC and the protective grounding terminal PE of the charging plug 5 may be formed as follows.

In one example, a resistor may be connected between the charging connection confirming terminal CC and the protective grounding terminal PE of the charging plug 5. In another example, at least two resistors may be connected between the charging connection confirming terminal CC and the protective grounding terminal PE of the charging plug 5. Although only two ways to form a path between the charging connection confirming terminal CC and the protective grounding terminal PE of the charging plug 5 are described above, it should be appreciated by those skilled in the art that there are various ways to form a path between the charging connection confirming terminal CC and the protective grounding terminal PE of the charging plug 5.

Figure 2:
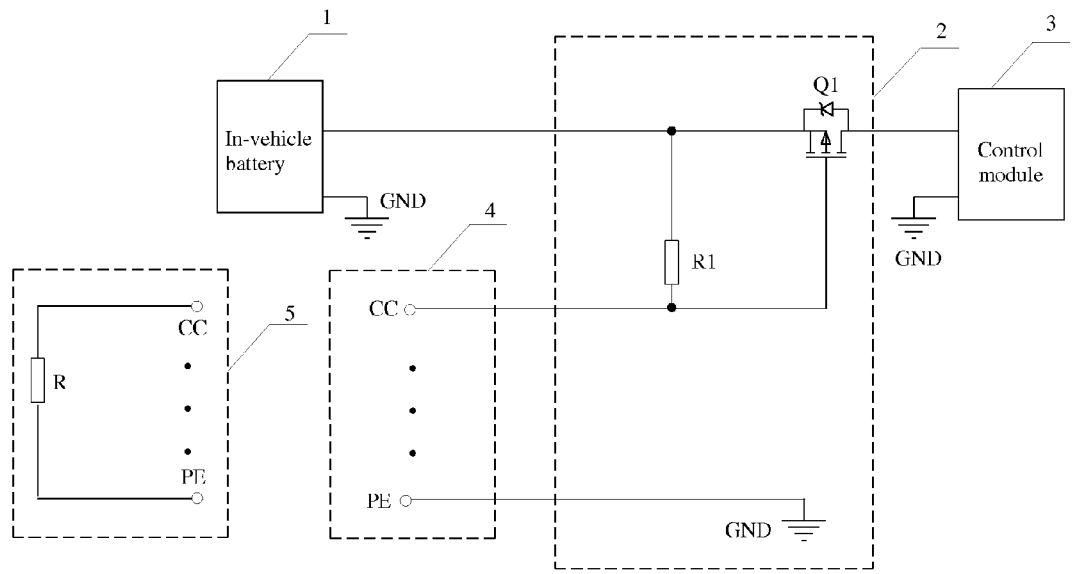
FIG. 2 is a schematic circuit diagram showing an in-vehicle charging control device according to an exemplary embodiment of the present disclosure.

FIG. 2 illustrates a schematic circuit diagram showing an in-vehicle charging control device according to an exemplary embodiment of the present disclosure. As shown in FIG. 2, the in-vehicle charging control device may comprise a control module 3, a charging socket 4 and a switching circuit 2. The charging socket 4 may have a charging connection confirming terminal CC and a protective grounding terminal PE. The switching circuit 2 may comprise a first MOS transistor Q1 and a first resistor R1. The first MOS transistor Q1 has a source, a gate and a drain. One end of the first resistor R1 is connected with the in-vehicle battery 1 and the source of the first MOS transistor Q1, the other end of the first resistor R1 and the gate of the first MOS transistor Q1 are connected with the charging connection confirming terminal CC of the charging socket 4, the drain of the first MOS transistor Q1 is connected with the control module 3, and the protective grounding terminal PE of the charging socket 4 is grounded.

The charging connection confirming terminal CC and the protective grounding terminal PE of the charging socket 4 match with a charging connection confirming terminal CC and a protective grounding terminal PE of a charging plug 5 respectively, in which a resistor R is connected between the charging connection confirming terminal CC and the protective grounding terminal PE of the charging plug 5.

When the charging plug 5 is plugged in the charging socket 4, that is, the in-vehicle battery 1, the resistor R and the first resistor R1 form a closed circuit, a voltage difference between the gate and the source of the first MOS transistor Q1 is generated. The voltage difference turns on the first MOS transistor Q1, so that the in-vehicle battery 1 can supply power to the control module 3.

When the charging plug 5 is not plugged in the charging socket 4, that is, the in-vehicle battery 1, the resistor R and the first resistor R1 do not form a closed circuit, there is no voltage difference between the gate and the source of the first MOS transistor Q1, so that the first MOS transistor Q1 is in an off state and the in-vehicle battery 1 may not supply power to the control module 3 so as to reduce the energy consumption of the in-vehicle battery 1.

Figure 3:
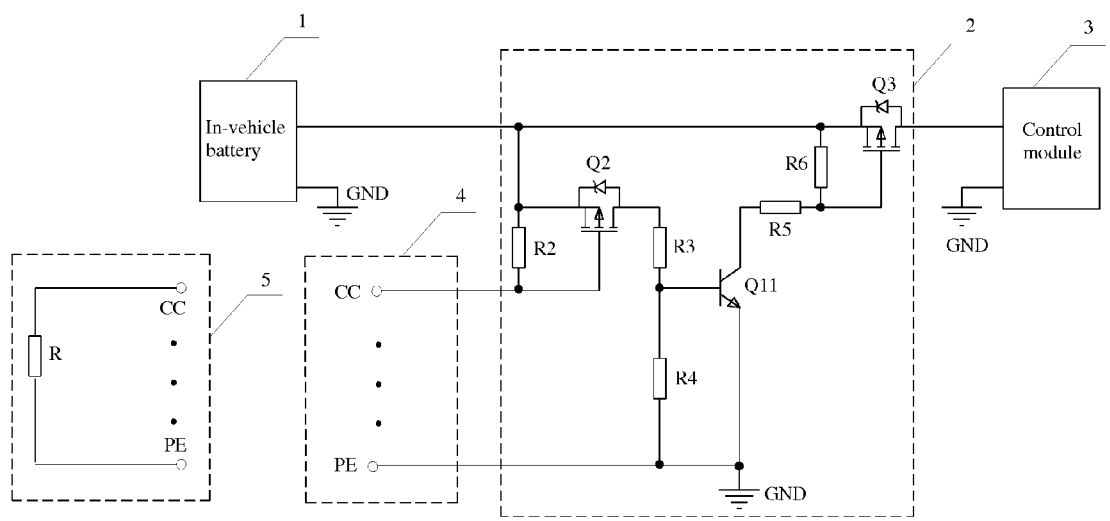
FIG. 3 is a schematic circuit diagram showing an in-vehicle charging control device according to another exemplary embodiment of the present disclosure.

FIG. 3 illustrates a schematic circuit diagram showing an in-vehicle charging control device according to another exemplary embodiment of the present disclosure. As shown in FIG. 3, in this embodiment, the in-vehicle charging control device may comprise a control module 3, a charging socket 4 and a switching circuit 2. The charging socket 4 may have a charging connection confirming terminal CC and a protective grounding terminal PE. The switching circuit 2 may comprise a second MOS transistor Q2, a third MOS transistor Q3, a bipolar transistor Q11, a second resistor R2, a third resistor R3, a fourth resistor R4, a fifth resistor R5 and a sixth resistor R6. The second MOS transistor Q2 has a source, a gate and a drain. The third MOS transistor Q3 has a source, a gate and a drain. The bipolar transistor Q11 has a base, an emitter and a collector. The source of the second MOS transistor Q2 is connected with the in-vehicle battery 1, and the gate of the second MOS transistor Q2 is connected with the charging connection confirming terminal CC of the charging socket 4. The second resistor R2 is connected between the source and the gate of the second MOS transistor Q2. The base of the bipolar transistor Q11 is connected with the drain of the second MOS transistor Q2 via the third resistor R3, and the emitter of the bipolar transistor Q11 is grounded. The fourth resistor R4 is connected between the base and the emitter of the bipolar transistor Q11. The gate of the third MOS transistor Q3 is connected with the collector of the bipolar transistor Q11 via the fifth resistor R5, the source of the third MOS transistor Q3 is connected with the in-vehicle battery 1, and the drain of the third MOS transistor Q3 is connected with the control module 3. The sixth resistor R6 is connected between the source and the gate of the third MOS transistor Q3. The protective grounding terminal PE of the charging socket 4 is grounded.

The charging connection confirming terminal CC and the protective grounding terminal PE of the charging socket 4 match with a charging connection confirming terminal CC and a protective grounding terminal PE of a charging plug 5 respectively. A resistor R is connected between the charging connection confirming terminal CC and the protective grounding terminal PE of the charging plug 5.

When the charging plug 5 is plugged in the charging socket 4, that is, the in-vehicle battery 1, the resistor R and the second resistor R2 form a closed circuit, a voltage difference between the gate and the source of the second MOS transistor Q2 is generated. The voltage difference turns on the second MOS transistor Q2. Thus, the in-vehicle battery 1, the third resistor R3 and the fourth resistor R4 form a closed circuit, and the bipolar transistor Q11 is triggered to switch on. Similarly, because the bipolar transistor Q11 is switched on, the in-vehicle battery 1, the fifth resistor R5 and the sixth resistor R6 form a closed circuit, and thus a voltage difference between the gate and the source of the third MOS transistor Q3 is generated to turn on the third MOS transistor Q3 and the in-vehicle battery 1 can supply power to the control module 3.

When the charging plug 5 is not plugged in the charging socket 4, that is, the in-vehicle battery 1, the resistor R and the second resistor R2 do not form a closed circuit, there is no voltage difference between the gate and source of the first MOS transistor Q1, so that the second MOS transistor Q2, the third MOS transistor Q3 and the bipolar transistor Q11 are all in an off state and the in-vehicle battery 1 may not supply power to the control module 3 so as to reduce the energy consumption of the in-vehicle battery 1.

It should be noted that the embodiments shall not be construed to limit the present disclosure. In an embodiment, the switching circuit 2 may adopt various switching circuits which have a switching characteristic and meet the following requirements. When the charging plug 5 is plugged in the charging socket 4 (that is, the in-vehicle battery 1 and the charging connection confirming terminal CC and the protective grounding terminal PE of the charging plug 5 form a closed circuit), the switching circuit 2 is in a conducting state, or the switching circuit 2 is in a disconnection state when the charging plug 5 is not plugged in the charging socket 4.

The switching circuit 2 may not be limited to the switching circuits 2 shown in FIG. 2 and FIG. 3, but may be other switching circuits which have the switching characteristic. For example, the switching circuit 2 may comprise at least one MOS transistor and/or bipolar transistor, and at least one resistor, etc. Other switching circuits that may be suitable for the present disclosure will not be described in detail here.

According to embodiments of the present disclosure, a vehicle charging system is provided. The vehicle charging system comprises the above-mentioned in-vehicle charging control device and a charging gun having the charging plug 5.

According to embodiments of the present disclosure, a vehicle is provided. The vehicle comprises an in-vehicle battery 1 and the above-mentioned in-vehicle charging control device. The in-vehicle battery 1 is connected with the control module 3 via the switching circuit 2.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A charging control device, comprising:
   a control module;
   a charging socket having a charging connection confirming terminal and a protective grounding terminal; and
   a switching circuit connected with the charging connection confirming terminal and the protective grounding terminal of the charging socket respectively,
   wherein the control module is connected with a battery via the switching circuit, the charging connection confirming terminal and the protective grounding terminal of the charging socket are configured to match with a charging connection confirming terminal and a protective grounding terminal of a charging plug respectively, and the switching circuit is in a conducting state when the charging plug is plugged in the charging socket and in a disconnection state when the charging plug is not plugged in the charging socket,
   wherein the switching circuit comprises:
      a first MOS transistor having a source, a gate, and a drain; and
      a first resistor,
      wherein one end of the first resistor is connected with the battery and the source of the first MOS transistor, the other end of the first resistor and the gate of the first MOS transistor are connected with the charging connection confirming terminal of the charging socket, the drain of the first MOS transistor is connected with the control module, and the protective grounding terminal of the charging socket is grounded.

2. The charging control device of claim 1, wherein the switching circuit comprises:
   a second MOS transistor having a source, a gate and a drain;
   a third MOS transistor having a source, a gate and a drain; and
   a bipolar transistor having a base, an emitter and a collector, wherein the source of the second MOS transistor is connected with the battery, the gate of the second MOS transistor is connected with the charging connection confirming terminal of the charging socket, the emitter of the bipolar transistor is grounded, the source of the third MOS transistor is connected with the battery, the drain of the third MOS transistor is connected with the control module, and the protective grounding terminal of the charging socket is grounded.

3. The charging control device of claim 2, wherein the switching circuit further comprises:
   a second resistor connected between the source and the gate of the second MOS transistor;
   a third resistor, via which the base of the bipolar transistor is connected with the drain of the second MOS transistor;
   a fourth resistor connected between the base and the emitter of the bipolar transistor;
   a fifth resistor, via which the gate of the third MOS transistor is connected with the collector of the bipolar transistor; and
   a sixth resistor connected between the source and the gate of the third MOS transistor.

4. The charging control device according to claim 1, further comprising at least one resistor connected between the charging connection confirming terminal and the protective grounding terminal of the charging plug.

5. A vehicle charging system, comprising:
   a charging control device comprising:
      a control module;
      a charging socket having a charging connection confirming terminal and a protective grounding terminal; and
      a switching circuit connected with the charging connection confirming terminal and the protective grounding terminal of the charging socket respectively,
      wherein the control module is connected with a battery via the switching circuit, the charging connection confirming terminal and the protective grounding terminal of the charging socket;
   a charging plug having a charging connection confirming terminal and a protective grounding terminal to match with the charging connection confirming terminal and the protective grounding terminal of the charging socket, wherein the switching circuit is in a conducting state when the charging plug is plugged in the charging socket and in a disconnection state when the charging plug is not plugged in the charging socket,
   wherein the switching circuit comprises:
      a first MOS transistor having a source, a gate and a drain; and
      a first resistor,
      wherein one end of the first resistor is connected with the battery and the source of the first MOS transistor, the other end of the first resistor and the gate of the first MOS transistor are connected with the charging connection confirming terminal of the charging socket, the drain of the first MOS transistor is connected with the control module, and the protective grounding terminal of the charging socket is grounded.

6. The charging control device of claim 5, wherein the switching circuit comprises:
   a second MOS transistor having a source, a gate and a drain;
   a third MOS transistor having a source, a gate and a drain; and
   a bipolar transistor having a base, an emitter and a collector,
   wherein the source of the second MOS transistor is connected with the battery, the gate of the second MOS transistor is connected with the charging connection confirming terminal of the charging socket, the emitter of the bipolar transistor is grounded, the source of the third MOS transistor is connected with the battery, the drain of the third MOS transistor is connected with the control module, and the protective grounding terminal of the charging socket is grounded.

7. The charging control device of claim 6, wherein the switching circuit further comprises:
   a second resistor connected between the source and the gate of the second MOS transistor;
   a third resistor, via which the base of the bipolar transistor is connected with the drain of the second MOS transistor;
   a fourth resistor connected between the base and the emitter of the bipolar transistor;
   a fifth resistor, via which the gate of the third MOS transistor is connected with the collector of the bipolar transistor; and
   a sixth resistor connected between the source and the gate of the third MOS transistor.

8. The charging control device according to claim 5, further comprising at least one resistor connected between the charging connection confirming terminal and the protective grounding terminal of the charging plug.

9. A vehicle, comprising:
   an in-vehicle battery;
   an in-vehicle charging control device comprising:
      a control module;
      a charging socket; and
      a switching circuit connected with the charging socket,
      wherein the control module is connected with a battery via the switching circuit, and the switching circuit is in a conducting state when a charging plug is plugged in the charging socket and in a disconnection state when the charging plug is not plugged in the charging socket,
   wherein the switching circuit comprises:
      a first MOS transistor having a source, a gate and a drain; and
      a first resistor,
      wherein one end of the first resistor is connected with the battery and the source of the first MOS transistor, the other end of the first resistor and the gate of the first MOS transistor are connected with the charging socket, and the drain of the first MOS transistor is connected with the control module.

10. The charging control device of claim 9, wherein the switching circuit comprises:
    a second MOS transistor having a source, a gate and a drain;
    a third MOS transistor having a source, a gate and a drain; and
    a bipolar transistor having a base, an emitter and a collector,
    wherein the source of the second MOS transistor is connected with the battery, the gate of the second MOS transistor is connected with the charging connection confirming terminal of the charging socket, the emitter of the bipolar transistor is grounded, the source of the third MOS transistor is connected with the battery, the drain of the third MOS transistor is connected with the control module, and the protective grounding terminal of the charging socket is grounded.

11. The charging control device of claim 10, wherein the switching circuit further comprises:
   a second resistor connected between the source and the gate of the second MOS transistor;
   a third resistor, via which the base of the bipolar transistor is connected with the drain of the second MOS transistor;
   a fourth resistor connected between the base and the emitter of the bipolar transistor;
   a fifth resistor, via which the gate of the third MOS transistor is connected with the collector of the bipolar transistor; and
   a sixth resistor connected between the source and the gate of the third MOS transistor.

\* \* \* \* \*